Sept. 21, 1943.　　　L. M. PIDGEON　　　2,330,143
METHOD AND APPARATUS FOR PRODUCING MAGNESIUM
Filed Feb. 11, 1942

INVENTOR:
LLOYD M. PIDGEON
BY A. E. MacRae
ATTORNEY.

Patented Sept. 21, 1943

2,330,143

UNITED STATES PATENT OFFICE 2,330,143

METHOD AND APPARATUS FOR PRODUCING MAGNESIUM

Lloyd Montgomery Pidgeon, Rockcliffe Park, Ontario, Canada, assignor, by mesne assignments, to Dominion Magnesium Limited, Toronto, Ontario, Canada, a corporation of Canada Application February 11, 1942, Serial No. 430,406
In Canada October 22, 1941

23 Claims. (Cl. 75—67)

This invention relates to the thermal reduction of calcined magnesium containing materials in metal retorts, and is particularly directed to overcoming hazards and effecting economies in the commercial production of substantially pure magnesium metal.

In my copending application Serial Number 417,810, filed November 3, 1941, of which this application is a continuation in part, there is disclosed a process and apparatus for recovering volatilizable metals, including magnesium, in sublimed form and free from other metals of different vapour pressures. The invention there disclosed is primarily directed to the fractionation and separate removal of the metals extracted from the charge of material in the heating vessel.

This application is directed to important features of the invention as applied to the direct thermal reduction by ferrosilicon of calcined, and preferably crystalline, magnesium containing materials, as will appear from the following description in conjunction with the accompanying drawing in which—

Figure 2:
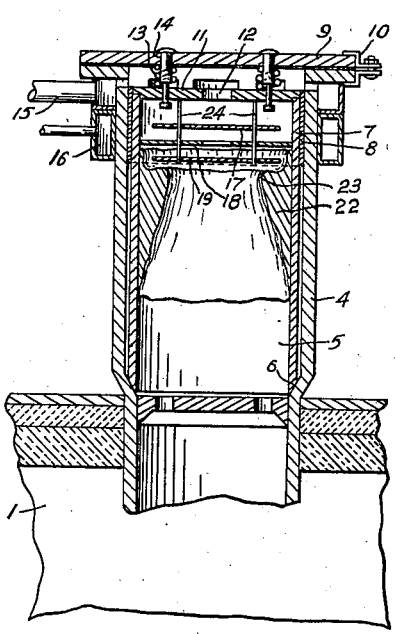
Figure 2 is a sectional view of the condenser portion of a retort.

In the drawing I represents a furnace in which a battery of metal retorts 2 are horizontally disposed, with the reducing portion 3 of the retort in the heat reservoir of the furnace and the condensing portion 4 without the furnace for charging and discharging at atmospheric pressure. The furnace may be heated in any desired way to provide a substantially constant reservoir from which the retorts absorb heat to uniformly heat the charge therein. Electric heating is desirable in providing a static heat reservoir with a controlled neutral atmosphere. If gas, oil or other fuels are used, care should be taken to avoid corrosive gases which react with the metal of the retorts. The heat resisting alloy steel of which the retorts are formed is expensive and long life of the retorts is essential to economical operation.

Within the exposed or condensing zone of each retort is a removable condenser 5, the inner end of which adjacent the furnace is seated in pressure contact 6 with the wall of the retort, and the outer end 7 of which is in thermal contact with the retort wall over a relatively narrow area. As shown in Figure 2, this thermal contact is provided by a heat conducting band 8 of copper, brass or the like which may be secured to the condenser or retort in any desired way.

The outer open end of the retort is closed by a cover 9 which is clamped tightly to the retort by any suitable means 10. The condenser is closed by the plate 11 having an opening 12 therein. The coil springs 13 on bolts 14 exert a pressure on plate 11 to tightly seat the condenser in the retort. Means for producing a reduced pressure in the retort are illustrated by the pipe 15. A cooler 16 through which water may be circulated surrounds the outer end of the retort. Carried by the condenser closure plate 11 is the fractionating condenser means consisting of the series of spaced discs 17, 18, 19 providing a relatively long path of travel for vapours. The innermost disc 19 is out of thermal contact with the condenser wall and remains at a higher temperature than the other discs.

Figure 3:
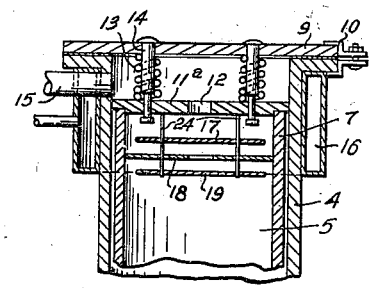
Figure 3 is a similar view of a modified form.
Figure 4:
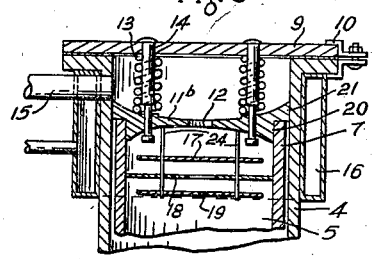
Figure 4 is a similar view of a further modification.
Figure 1:
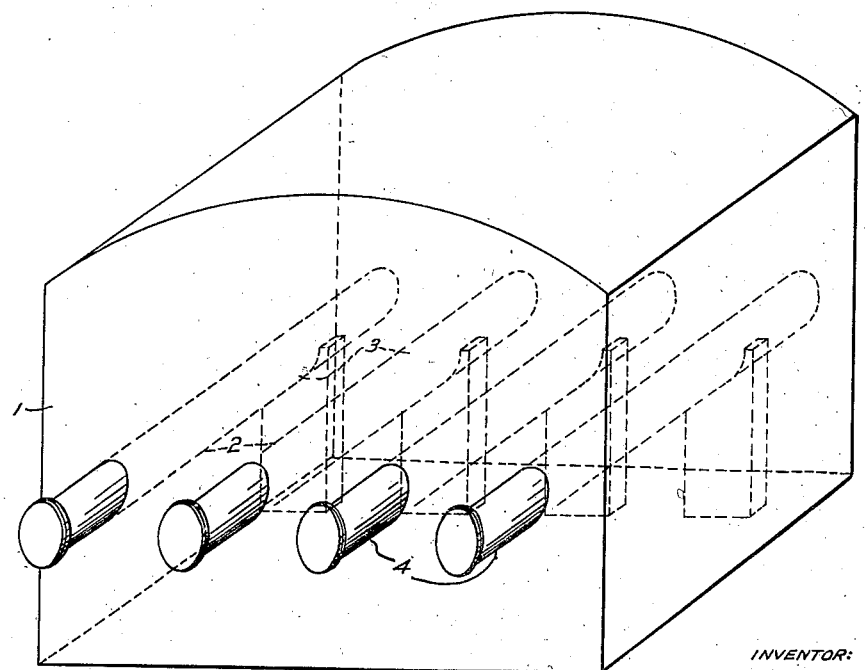
Figure 1 is a diagrammatic illustration of a furnace in perspective.

As shown in Figures 3 and 4 the outer end of the retort is somewhat elongated beyond the zone occupied by the removable condenser 5 for facility in cooling the fractionating condenser zone of the retort. In Figure 3 the condenser closure plate 11a extends beyond the wall of the removable condenser to contact the retort wall to further facilitate cooling of the fractionating condenser zone. In Figure 4 this plate 11b is thicker at its periphery to provide substantial thermal contacts 20 and 21 for the wall of the removable condenser and that of the retort respectively.

In operation the charge of briquetted magnesium containing material and ferrosilicon is successively charged into the retorts. The removable condenser and the fractionating condenser are put in place and the retorts are evacuated to provide the desired reduced pressure therein. The temperature immediately surrouding the reducing portion of the retorts being in the neighborhood of 1150° C. the magnesium, sodium and the like in the charge are volatilized without substantial injury to the retorts. The metal vapours pass from the reducing portion of the retort to the condensing zone. The vapours impinging upon the disc 19 are deflected to the wall of the removable condenser where the magnesium condenses in a unitary structure 22 substantially as shown. The vapour of metals of higher vapour pressure if any are present passes around the disc 19 through the perforated disc 18 and is condensed in the cooler zone of the fractionating condenser to be removed therewith independently of the magnesium. The thermal contact of this outer portion of the removable condenser with the wall of the retort, which is cooled by water circulation, insures the drop in temperature found necessary to form distinct separate fractions of the sublimed metals.

The disc 19, being out of direct thermal contact with the condenser wall and remaining hot, insures deposition of the magnesium only on the wall of the removable condenser, where it builds up into a unitary structure with an inwardly projecting ledge 23. This structure of magnesium condensate is important in insuring against ignition when the metal is exposed to the atmosphere without cooling substantially below the condensing temperature of the metal. It will be observed that the only thermal contact which the hot disc 19 has with the retort is indirectly through the slender supporting rods 24.

When the heating cycle of the initially charged retort is complete, the vacuum is broken and the retort is discharged in air. The fractionating condenser is first removed carrying with it any pyrophoric metal fraction which most readily ignites when hot upon exposure to air, and which if not so removed is likely to ignite the hot magnesium fraction in the retort. The removable condenser with the pure magnesium fraction is then removed without the necessity of further cooling to avoid ignition. In this manner the fire and explosion hazard is eliminated and at the same time there is a minimum loss of the heat initially applied to the retort. The residue of the charge is removed and the retort is ready for a new charge. The several retorts are successively operated in this manner without removal from the furnace.

In this way, with the retorts remaining permanently in the furnace during their useful life, successive heating up and cooling down of the retorts is avoided, and their life correspondingly prolonged. At the same time due to the fact that the retorts are maintained constantly at the reduction temperature for the charges placed therein all heat loss due to cooling down and reheating the retorts is avoided.

It will be observed that the reducing portion of the retort is long in relation to the condenser portion. It has been found that the condenser portion need be but about one sixth of the length of the retort. This is due to the condensation and removal of any sodium separate from the magnesium, which by avoiding the fire hazard requires less cooling of the condenser portion of the retort. This in turn requires a minimum of expensive retort metal per pound of magnesium produced, since about five sixths of the retort is utilized in conducting heat to the charge to be reduced.

The briquetted charge of calcined crystalline magnesium containing material and ferrosilicon is preferably heated in air to about 850° C. to degas the charge feeding it hot to the furnace.

I claim:

1. In the production of magnesium through sublimation by thermal reduction of magnesium containing material with ferrosilicon under reduced pressure in a retort in a heating furnace, the method which comprises fractionately condensing metal vapours in a portion of the retort without the furnace, and without cooling the condensing portion of the retort substantially below the subliming temperature of said vapours separately discharging under normal atmospheric conditions the fractions of solid metals.

2. In the production of magnesium through sublimation by thermal reduction of magnesium containing material with ferrosilicon in metal retorts the reducing portion of which is horizontally disposed within a heating furnace, the method which comprises fractionately condensing to solid metal metal vapours in a portion of the retorts without the furnace, and upon completion of the evolution of vapours from the reducing portion of the retorts and without cooling the condensing portion of the retorts substantially below the subliming temperature of said vapours successively opening the retorts to the atmosphere, and separately removing the hot solid metal fractions from each retort.

3. In the thermal reduction by ferrosilicon of calcined magnesium containing material under reduced pressure in metal retorts under substantially constant temperature in a furnace with the condensing end of the retorts without the furnace, the method which comprises condensing to solids in separate fractions the metal vapours evolved from the reducing charge in the retorts and without further cooling of the retorts removing the said separate fractions of solid metal successively from the retorts.

4. In the thermal reduction by ferrosilicon of calcined crystalline magnesium containing material under reduced pressure in a plurality of metal retorts in a furnace at substantially constant temperature with the condensing end of the retorts without the furnace, the method which comprises successively charging the retorts at atmospheric pressure, sealing the retorts and reducing the pressure therein and vaporizing the magnesium in the charge, condensing to solids in separate fractions the metal vapours evolved from the charge in each retort, without further cooling of the retorts successively removing from each retort under normal atmospheric conditions the said separate fractions of metal, and thereafter removing the spent residue recharging the retort and repeating the cycle.

5. A furnace for the production of magnesium by thermal reduction with ferrosilicon comprising a heat reservoir, a plurality of metal retorts horizontally disposed with a reducing portion within the furnace and a condensing portion outside the furnace, a removable metal liner for collecting magnesium within the condensing zone of each retort and having at its outer end direct thermal contact with the wall of the retort, means for water cooling the retort wall adjacent said thermal contact and separate means within said water cooled zone of the retort for collecting and removing pyrophoric metal independently of magnesium.

6. Apparatus as defined in claim 5 wherein said thermal contact comprises a narrow metal band between said liner and the retort wall.

7. Apparatus as defined in claim 5 wherein said thermal contact comprises a closure plate for said condenser liner, the periphery of said plate contacting the wall of the retort.

8. Apparatus as defined in claim 5 wherein said thermal contact comprises a closure plate for said condenser liner, said plate having broadened shoulders engaging the liner and the wall of the retort.

9. Apparatus for producing magnesium by thermal reduction and sublimation comprising a furnace, a plurality of metal retorts fixedly and substantially horizontally arranged within the furnace with a minor portion thereof extending outside the furnace, and means for providing reduced pressure within the retorts, each retort having within the condenser portion outside the furnace a liner for collecting and removing pure magnesium and separate means for collecting and independently removing pyrophoric metal.

10. Apparatus as defined in claim 9 having in the condenser portion of each retort a vapour baffling disc free from direct thermal contact with the condenser wall.

11. Apparatus as defined in claim 9 having suspended in the condenser portion of each retort a hot baffle to deflect magnesium vapour against the condenser wall to form a structure of condensed metal which will not readily ignite.

12. A method for the direct production of unitary structural masses of magnesium, which comprises heating magnesia containing material with ferrosilicon under reduced pressure in a retort in a heating furnace to reduce the magnesia and form vapours of magnesium, sodium and like pyrophoric metals, cooling the vapours to condense in one zone the magnesium vapour to form a unitary structural mass of magnesium substantially free from sodium and like pyrophoric metal, and removing the same from the retort in air independently of sodium and like pyrophoric metals.

13. A method for the direct production of unitary structural masses of magnesium, which comprises heating magnesia containing material with ferrosilicon under reduced pressure in metal retorts in a furnace to reduce the magnesia and form vapours of magnesium, sodium and like pyrophoric metals, fractionately condensing said vapours in a portion of the retorts without the furnace to form unitary structural masses of magnesium substantially free from sodium and the like, and separately discharging under normal atmospheric conditions the fractions of condensed metals.

14. The direct method of producing magnesium from rock containing it, which comprises heating magnesia containing material with ferrosilicon under reduced pressure in a retort to reduce the magnesia and produce metals in vapour form, reducing the temperature of said vapours to deposit magnesium in solid phase in a unitary structural mass in one zone within the retort and sodium and like pyrophoric metal in another zone within the retort, and separately removing from the retort at atmospheric pressure the respective deposits of condensed metals.

15. The direct method of producing coherent masses of magnesium from rock containing it, which comprises maintaining metallic retorts at a substantially constant temperature to reduce magnesia and form metal vapours, charging said retorts with magnesia containing material and ferrosilicon, producing a low pressure within the retorts, condensing magnesium vapours into coherent structural form in one zone of the retort and sodium and like vapours in a cooler zone of the retort, and separately removing from the retort at atmospheric pressure the respective condensates.

16. Apparatus for producing coherent masses of magnesium from rock by thermal reduction under reduced pressure with ferrosilicon, comprising a furnace, at least one metal retort having a reducing portion without the furnace and a condensing portion without the furnace, means for providing reduced pressure within the retort, and means for condensing magnesium vapour and collecting the condensed metal in coherent structural form for removal from the retort independently of other vapours formed and condensed within the retort.

17. Apparatus for producing coherent masses of magnesium by thermal reduction under reduced pressure with ferrosilicon of magnesia containing material, comprising a furnace at a substantially constant temperature, metal retorts having a reducing portion within the furnace and a condensing portion without the furnace, means for providing reduced pressure within the retorts, means for condensing magnesium vapour in coherent structural form substantially free from sodium and like pyrophoric metal for removal from the retort independently of said pyrophoric metal, and means for separately collecting said condensed pyrophoric metal for removal from the retort.

18. A method of producing metallic magnesium by direct thermal reduction which comprises heating, to form metal vapours, magnesium containing material and ferrosilicon under reduced pressure in the reducing portion of a metal retort stationarily located in a furnace with an end of the retort without the furnace and constituting a condenser portion to receive said vapours, retarding the flow of the vapours in the condenser portion at a point spaced from its outer end to cause the magnesium vapors to condense into a coherent structural form and build up at said point spaced from the outer end of the condenser, removing the hot magnesium from the retort in air without ignition, withdrawing the hot residue and recharging the retort while hot.

19. A method of producing metallic magnesium by direct thermal reduction which comprises heating to form metal vapours magnesium containing material and ferrosilicon under reduced pressure in a metal retort disposed within a furnace with an end portion without the furnace for condensing said vapours, condensing the vapours within the condenser portion of the retort, retarding and deflecting the flow of said vapours at a point spaced from the outer end of the retort to cause magnesium vapour to condenser before passing said point, further cooling uncondensed vapours in a zone adjacent the outer end of the retort, removing the magnesium without ignition at atmospheric pressure, withdrawing the hot residue and recharging the retort while hot.

20. Apparatus for producing coherent masses of magnesium from magnesium containing rock by thermal reduction under reduced pressure with ferrosilicon, comprising a furnace, a plurality of metal retorts having a reducing and volatilizing portion within the furnace and at least one end portion without the furnace constituting a condenser for metal vapours, means for producing reduced pressure within the retorts, each condenser having in operation a relatively warm zone and a cooler zone, said zones being separated by a vapour deflecting and retarding partition having a vapour passage therethrough, and a removable closure for each condenser, said cooler zone being adjacent said closure.

21. A method of producing metallic magnesium by direct thermal reduction which comprises charging magnesium-containing material and ferrosilicon directly into a metal retort permanently located in a furnace maintained at the reduction temperature for the magnesium-containing material during the useful life of the retort, with an open end of the retort without the furnace and constituting a condenser portion to receive vapors, evacuating the retort and heating the magnesium-containing material and ferrosilicon under reduced pressure to form metal vapour, condensing all of the magnesium vapor into dense coherent structural form before reaching the outer end of the retort, and causing the magnesium to build up in thickness at a zone adjacent to but spaced from the outer end of the retort to form an inwardly projecting ledge at the end of the magnesium structure adjacent to and spaced from the outer end of the retort, discontinuing the evacuation, and opening the retort to air, while leaving the condensed magnesium in the condenser portion of the retort, then removing the hot magnesium while retaining its structural form from the retort in air without ignition, withdrawing the hot residue and recharging the retort while hot.

22. In the production of magnesium through sublimation by thermal reduction of magnesium-containing material with ferrosilicon in metal retorts the reducing portion of which is horizontally disposed within a heating furnace, the method which comprises maintaining the retorts permanently in the furnace during their life and maintaining the furnace during repeated operations at the reduction temperature for the magnesium-containing material, fractionally condensing to solid metal with the magnesium in dense coherent structural form metal vapors in a portion of the retorts without the furnace, and upon completion of the evolution of vapors from the reducing portion of the retorts and without cooling the condensing portion of the retorts substantially below the condensing temperature of said vapors successively opening the retorts to the atmosphere, and separately removing the hot solid metal fractions from each retort with the magnesium in dense coherent structural form, recharging each retort while hot with magnesium-containing material and ferrosilicon and repeating the cycle.

23. A method of producing metallic magnesium by direct thermal reduction, which comprises charging magnesium-containing material and ferrosilicon directly into the open end of a metal retort permanently located in a furnace maintained at the reduction temperature of the magnesium-containing material during the useful life of the retort, with said open end of the retort extending outside the furnace and constituting a condenser portion, inserting an open ended removable condenser sleeve in the condenser portion of said retort, sealing the open end of the retort and evacuating the interior thereof and heating the magnesium-containing material and ferrosilicon under reduced pressure to form magnesium vapour, condensing all of the magnesium vapor before reaching the outer end of the retort and causing the magnesium to deposit in a dense coherent unitary structure in the condenser sleeve, building up the thickness of the magnesium in a zone adjacent to but spaced from the outer end of the retort to form an inwardly projecting ledge at the end of the magnesium structure adjacent to but spaced from the outer end of said retort, discontinuing the evacuation and opening the retort to air while leaving the condensed magnesium in the condenser portion of the retort, then removing the condenser sleeve with the hot magnesium thereon while retaining its dense coherent unitary structure from the retort in air without ignition, separately withdrawing the hot residue, recharging the retort while hot, and repeating the cycle.

LLOYD MONTGOMERY PIDGEON.